Jan. 9, 1934.　　　　J. G. GERRISH　　　　1,942,809
MOTOR SNOWPLOW
Filed April 3, 1931
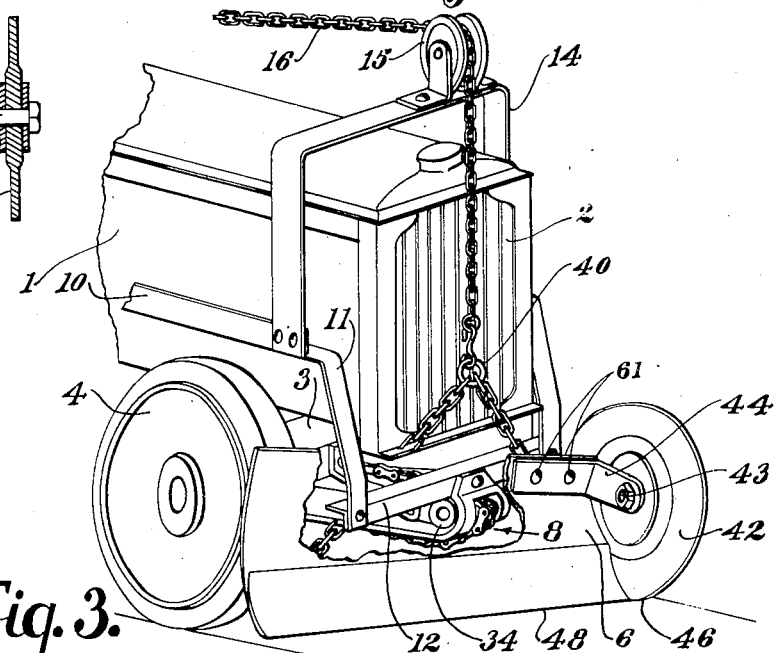
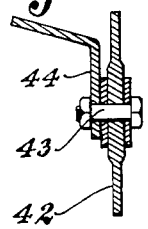
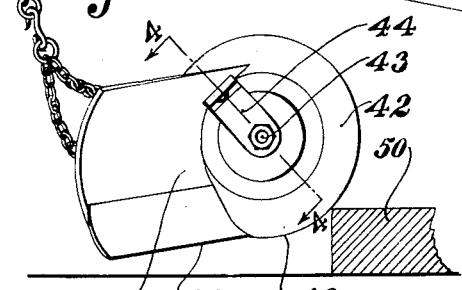
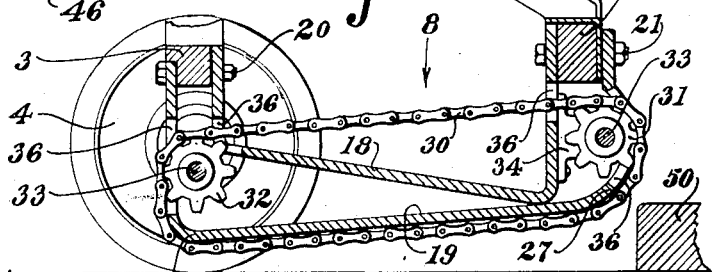
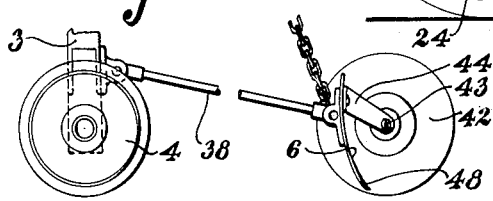
INVENTOR.
John G. Gerrish,
BY Robert K. Randall,
ATTORNEY.

Patented Jan. 9, 1934

1,942,809

UNITED STATES PATENT OFFICE 1,942,809

MOTOR SNOWPLOW

John G. Gerrish, Brookline, Mass.

Application April 3, 1931. Serial No. 527,493

9 Claims. (Cl. 37—42)

The invention relates to tractors and snowplow or scraper mechanism for or combined with a tractor; and a principal object is, to facilitate passage of the plow or scraper, and of the tractor proper, over high or abrupt obstacles such as curbs, to adapt the combined tractor-plow especially for use in removing snow from sidewalks.

For these purposes the plow is movably connected to the tractor and has means, preferably in the form of a wheel, arranged to engage the obstruction before the mold-board or scraping edge of the plow can strike it, and to lift the plow without assistance of the operator, so that it passes freely over the obstacle; and the tractor has at its forward end a lifting appliance, preferably in the form of a moving skid-belt or chain, which strikes the obstruction before it is engaged by the tractor front wheels and lifts them as it rides over the obstacle, thus avoiding any bumping contact of the wheels with the obstruction, angular strains or slueing, etc., as more fully set forth below.

This front-end lifting or climbing mechanism is especially useful in a tractor having small-diameter front wheels, as here shown, which is the common and usual construction.

The characteristics and advantages of the invention are further sufficiently explained in connection with the following detail description of the accompanying drawing, which shows one preferred embodiment. After considering this example, skilled persons will understand that many variations may be made without departing from the principles disclosed; and I contemplate employment of any structures that are properly within the scope of the appended claims.

In the drawing,—

Fig. 1 is a right-front perspective view of the front end of a tractor, with a snow plow and tractor-skid thereon, embodying the invention in one form.

Fig. 2 is a vertical, central, longitudinal section of the front axle, frame, and tractor-skid structure.

Fig. 3 is a side elevation of the plow and plow-lifting structure.

Fig. 4 is a section at 4, 4, Fig. 3.

Fig. 5 is a view in vertical, longitudinal section, showing principally details of the articulated connection of the plow to the tractor-frame or axle.

Figs. 1 and 2 represent the front end of a tractor of any known or suitable type for present purposes, including the engine hood 1, radiator 2, front axle 3, and front steering wheels 4 connected to the axle and provided with a steering linkage as usual.

For proper mounting or support of the snow plow (or scraper) 6 and skid (or front-lifting) structure 8 a frame is provided, comprising longitudinal side-members 10 having downturned forward portions 11, the ends of which are connected by a cross-bar 12, located well forward of the axle. The side-members 10 are fixedly connected in any suitable way to the chassis frame-structure or the main body of the tractor.

This frame also includes a forward arch or bridge member 14 connected to the side-members 10, and supporting a pulley 15, directing a plow-lifting or adjusting cable or chain 16, which runs to a drum or winch convenient to the driver (not here shown).

The front-lifting or skid-structure 8 is located preferably at the longitudinal center line of the vehicle. It has a frame including upper and lower members 18 and 19 respectively, the rear ends of which are upturned and connected to the axle 3 as by screws or bolts 20, and the front ends, also upturned, are connected to the cross-bar 12 as by bolts 21. The lower member 19 of the skid-frame constitutes a fixed skid or runner having its straight lower portion extending forward and upward at a slight angle to the horizontal from a point 24 below the axle where it is a few inches above the ground (or front-wheel ground-contact points 25), and terminating in a more sharply upwardly-curved front-end portion 27.

The skid-frame also supports a movable lifting or skid element, in the nature of a continuous belt, or specifically, as shown, a chain 30 passing about rotary supports or guides such as sprockets 31 and 32. These are located substantially at front and rear ends of the skid-frame, and mounted to turn on or with shafts 33, supported in sockets or bearings 34 on or secured to the skid-frame members. The upper, rear, and forward portions of the chain pass through slots 36 in the skid-frame members, which slots also accommodate segments of the sprockets. The upper stretch of the chain extends between the sprockets above the skid-frame, and the lower active stretch underlies and is slidably supported and guided by the lower skid-member 19 conforming to its contour, as sufficiently above described, and as clearly shown in Fig. 2.

The plow or scraper 6 is set at an angle, as usual, and is supported on or from the cross-bar 12 or axle 3 (or both) in any suitable way; as shown, (Fig. 5) articulated struts or radius rods 38 connect the plow to the axle. Details of such connections are not a part of the invention.

The adjusting or elevating chain 16, above mentioned, is branched at 40, and ends of the branch portions are connected to the plow or mold-board, near opposite ends thereof to adjust the position of the scraping edge, as to lift the plow to "clear" position.

Ordinarily, however, in accordance with the invention, the scraping edge is supported in proper position, slightly above the side-walk (or road) surface, by a supporting, or gauging and lifting wheel 42, substantially of disk form, revolubly mounted on a pivot or shaft 43, fixed in a bracket 44 which is secured either fixedly or adjustably, as by bolts 61, to the mold-board 6. The wheel is thus located close to the leading end of the plow, and turns in a vertical, longitudinal plane. Its ground-bearing point 46 is slightly below the scraping edge 48, thus properly gauging the position or clearance of this edge from the surface to be cleared. The lifting-wheel also serves to trim smoothly the face of the remaining snow mass, adjacent the leading end of the scraper, so that the plow makes a clean, straight-sided cut at this end, a feature of value in crusted or packed snow.

The lifting-wheel is also located substantially forward of the leading end and edge of the scraper, so that in approaching an obstruction, such as a side-walk curb 50, Fig. 3, the wheel first strikes it, and by angular reaction is raised until its lowest tread surface rests upon the curb, and in this action the scraper 6 is also raised, so that it, or its leading end at least, completely clears the obstruction. The operator is thus relieved from necessity of raising the plow in running from the street level up onto a side-walk, as in crossing from one side-walk to the other. Likewise the wheel prevents digging of the plow into the road-surface when descending a curb.

The forward tractor-lifting or skid-structure 8 also greatly facilitates surmounting curbs in a manner best explained in Fig. 2. This lifting means is especially advantageous in a tractor of the type shown, having steering wheels of small diameter, which do not easily roll over a high obstacle; also regardless of wheel diameter, the common practice of approaching a curb diagonally to make mounting easier by bringing one wheel into contact with and over the curb before the other strikes it, imposes severe diagonal or twisting strains on the wheels, steering knuckles, linkage, axle and springs. Such difficulties or disadvantages are avoided, in accordance with the invention, by permitting the tractor to be driven in a right-angular direction toward the curb (or other obstruction), whereupon, as is evident in Fig. 2, the rounded, up-curved portion of the skid-chain 30 first strikes the curb-edge and is fixed thereon by frictional engagement; as the tractor advances, the skid-member or plate 19 slides diagonally forward and upward over the lower stretch of the chain which moves relatively to the member 19, and around its sprockets 31 and 32, by reason of its engagement with the curb-edge, the chain providing a relatively easy sliding surface against the skid 19 while the skid is acting on the order of a cam to lift the tractor front-end over the curb. Thereafter the wheel treads encounter the curb-edge at points slightly forward and above the lowermost ground-contact points, and only a slight additional "lift" by reaction at a favorable angle, is required to bring the wheels onto the horizontal side-walk surface or level. It will now be understood that approach to the curb may also be made at a reasonable obtuse angle, bringing one wheel tread into contact with the curb-edge somewhat in advance of the other, (after preliminary lifting by the skid mechanism, as above), without any considerable or objectionable strains upon the wheels, axles, etc., on account of the small lift, and correspondingly small lateral wrenching action occasioned by wheel-contact with the curb in this mode of approach.

Evidently also, either the plow-lifting or the tractor-lifting mechanism may be employed together or separately; and either or both of these mechanisms may be easily attached to and removed from the tractor, making the latter available for various uses, aside from snow-removal or analogous scraping operations.

What is claimed as my invention is:

1. A tractor having in combination, a front axle and wheels, a forwardly extending substantially central skid structure having a forward-upward-slanting skid surface terminating rearwardly moderately above the normal ground-contact points of the wheels, a scraper forward of the skid structure, and a wheel at the leading end of the scraper.

2. A tractor having in combination, a front axle and wheels, a forwardly extending substantially central skid structure having a forward-upward-slanting skid surface, a movable skid belt directed in a continuous course and having its lower, active stretch underlying and guided by said skid surface, a scraper forward of the skid structure, and means in connection with the scraper to lift it over obstacles.

3. A tractor having in combination, a front axle and wheels, a forwardly extending substantially central skid structure having a forward-upward-slanting skid rail terminating rearwardly moderately above the normal ground-contact points of the wheels, a movable skid chain directed in a continuous course in the skid structure, and having its lower, active stretch underlying and guided by said skid rail, a scraper forward of the skid structure, and means in connection with the scraper to lift it over obstacles.

4. A tractor having in combination, a front axle and wheels, a forwardly extending substantially central skid structure having a forward-upward-slanting skid face terminating rearwardly moderately above the normal ground-contact points of the wheels, forwardly and rearwardly located pulleys, a continuous skid belt passing over the pulleys and having its lower active stretch underlying and guided by said skid face, a scraper forward of the skid structure, and means in connection with the scraper to lift it over obstacles.

5. A tractor having in combination, a front axle and wheels, a forwardly extending substantially central skid, forwardly and rearwardly located sprockets, a continuous skid chain passing over the sprockets and having its lower active stretch underlying and guided by said skid face, a scraper forward of the skid structure, and means in connection with the scraper to lift it over obstacles.

6. A tractor having in combination, a front axle and wheels, a cross-bar forward of the axle, a skid structure substantially at the longitudinal center line of the tractor, connected to the axle and cross-bar, and having a lower skid-face extending diagonally forward and upward from a point adjacent the vertical plane of the axle and moderately above the front-wheel ground-contact points, and a scraper forward of the skid structure.

7. The structure defined in claim 6 with the scraper diagonally and movably located forward of said cross-bar, and a lifting wheel revolubly mounted on the scraper adjacent its leading end.

8. A tractor having in combination a front axle and wheels, an auxiliary frame comprising side members and a cross-bar forward of the axle, a skid structure substantially at the longitudinal center line of the tractor, connected to the axle and cross-bar, and having a lower skid-face extending diagonally forward and upward from a point adjacent the vertical plane of the axle and moderately above the front-wheel ground-contact points, a skid belt supported to move in a circuitous course in the skid structure, and having its active stretch underlying, shaped, and guided by, said skid-face and a scraper forward of the skid structure.

9. The structure defined in claim 8 with the addition of belt supporting and guiding pulleys forwardly and rearwardly located in the skid frame.

JOHN G. GERRISH.